of

(12) United States Patent
Kimura

(10) Patent No.: US 8,423,550 B2
(45) Date of Patent: Apr. 16, 2013

(54) STORAGE MEDIUM FOR ELECTRONIC INFORMATION PROCESSING PROGRAM, ELECTRONIC INFORMATION PROCESSING SYSTEM, AND ELECTRONIC INFORMATION PROCESSING METHOD

(75) Inventor: Yoshiro Kimura, Ishikawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 607 days.

(21) Appl. No.: 12/111,260

(22) Filed: Apr. 29, 2008

(65) Prior Publication Data

US 2009/0063520 A1  Mar. 5, 2009

(30) Foreign Application Priority Data

Sep. 4, 2007  (JP) ................. 2007-229381

(51) Int. Cl.
  *G06F 7/00*   (2006.01)
  *G06F 17/30*  (2006.01)
(52) U.S. Cl.
  USPC ........................... 707/737; 707/791; 707/802
(58) Field of Classification Search .................. 707/791, 707/802, 737
  See application file for complete search history.

(56) References Cited

U.S. PATENT DOCUMENTS

| 5,706,501 A * | 1/1998 | Horikiri et al. ............... 709/226 |
| 2006/0020520 A1* | 1/2006 | Lange et al. .................... 705/26 |
| 2006/0149821 A1* | 7/2006 | Rajan et al. ................... 709/206 |

FOREIGN PATENT DOCUMENTS

| JP | 7319773 | 12/1995 |
| JP | 944393 | 2/1997 |
| JP | 2005196595 | 7/2005 |
| JP | 2006163873 | 2/2006 |

OTHER PUBLICATIONS

Hideto et al. "File Classifcation Program, File Classification Device, File Classification Method." Jun. 22, 2006.*
Japanese Office Action issued on Nov. 17, 2009 in connection with corresponding Japanese Patent Application No. 2007-229381 and English translation thereof.

* cited by examiner

*Primary Examiner* — Kimberly Wilson
*Assistant Examiner* — Hexing Liu
(74) *Attorney, Agent, or Firm* — Gesmer Updegrove LLP

(57) ABSTRACT

A computer-readable medium includes a program including processes of correlating electronic information which is correlated to a first correlation location in a first correlation structure also to a second correlation location in a second correlation structure according to a correlation condition based on the first correlation location or the electronic information, and executing an operation on the electronic information or the first correlation location in the first correlation structure, wherein there can be switched permission and forbiddance of execution of at least a part of the operations, among the operations, which changes a correlation result in the correlating.

19 Claims, 9 Drawing Sheets

| | ACCESS RIGHT | NORMAL MODE | CONSTRAINT MODE |
|---|---|---|---|
| FILE | DELETE | DEPENDS ON SETTING | SIMILAR TO NORMAL MODE |
| | ATTRIBUTE REFER | DEPENDS ON SETTING | SIMILAR TO NORMAL MODE |
| | ATTRIBUTE CHANGE | DEPENDS ON SETTING | SIMILAR TO NORMAL MODE |
| | ACCESS RIGHT CHANGE | DEPENDS ON SETTING | SIMILAR TO NORMAL MODE HOWEVER, FOLLOWING OPERATIONS FOR FILE IN CLASSIFICATION TARGT RANGE AND HAVING CLASSIFICATION TARGET ATTRIBUTE ARE FORBIDDEN REGARDLESS OF SETTING (1) DELETION (2) CHANGE TO CLASSIFICATION NON-TARGET ATTRIBUTE (3) MOVEMENT TO OUTSIDE OF CLASSIFICATION TARGET RANGE |
| DOCUMENT | CONTENT REFER | DEPENDS ON SETTING | SIMILAR TO NORMAL MODE |
| | CONTENT CHANGE | DEPENDS ON SETTING | SIMILAR TO NORMAL MODE |
| FOLDER | DELETE | DEPENDS ON SETTING | SIMILAR TO NORMAL MODE |
| | ATTRIBUTE REFER | DEPENDS ON SETTING | SIMILAR TO NORMAL MODE |
| | ATTRIBUTE CHANGE | DEPENDS ON SETTING | SIMILAR TO NORMAL MODE |
| | ACCESS RIGHT CHANGE | DEPENDS ON SETTING | SIMILAR TO NORMAL MODE |
| | ENTRY ADD | DEPENDS ON SETTING | SIMILAR TO NORMAL MODE |
| | ENTRY DELETE | DEPENDS ON SETTING | SIMILAR TO NORMAL MODE HOWEVER, THE FOLLOWING ARE FORBIDDEN (4) NEW REGISTRATION OF FILE IN CLASSIFICATION TARGET RANGE AND HAVING CLASSIFICATION TARGET ATTRIBUTE (5) CHANGE OF ATTRIBUTE OF FILE IN CLASSIFICATION TARGET RANGE AND HAVING CLASSIFICATION NON-TARGET ATTRIBUTE TO CLASSIFICATION TARGET ATTRIBUTE (6) CHANGE OF ATTRIBUTE OF FILE IN CLASSIFICATION TARGET RANGE AND HAVING CLASSIFICATION TARGET ATTRIBUTE TO CLASSIFICATION NON-TARGET ATTRIBUTE (7) MOVEMENT OF FILE IN CLASSIFICATION TARGET RANGE AND HAVING CLASSIFICATION TARGET ATTRIBUTE TO OUTSIDE OF CLASSIFICATION TARGET RANGE (8) MOVEMENT OF FILE OUTSIDE OF CLASSIFICATION TARGET RANGE AND HAVING CLASSIFICATION TARGET ATTRIBUTE TO CLASSIFICATION TARGET RANGE |

| | ACCESS RIGHT | NORMAL MODE | CONSTRAINT MODE |
|---|---|---|---|
| FILE | DELETE | DEPENDS ON SETTING | SIMILAR TO NORMAL MODE |
| | ATTRIBUTE REFER | DEPENDS ON SETTING | SIMILAR TO NORMAL MODE |
| | ATTRIBUTE CHANGE | DEPENDS ON SETTING | SIMILAR TO NORMAL MODE |
| | ACCESS RIGHT CHANGE | DEPENDS ON SETTING | SIMILAR TO NORMAL MODE HOWEVER, FOLLOWING OPERATIONS FOR FILE IN CLASSIFICATION TARGT RANGE AND HAVING CLASSIFICATION TARGET ATTRIBUTE ARE FORBIDDEN REGARDLESS OF SETTING (1) DELETION (2) CHANGE TO CLASSIFICATION NON-TARGET ATTRIBUTE (3) MOVEMENT TO OUTSIDE OF CLASSIFICATION TARGET RANGE |
| DOCUMENT | CONTENT REFER | DEPENDS ON SETTING | SIMILAR TO NORMAL MODE |
| | CONTENT CHANGE | DEPENDS ON SETTING | SIMILAR TO NORMAL MODE |
| FOLDER | DELETE | DEPENDS ON SETTING | SIMILAR TO NORMAL MODE |
| | ATTRIBUTE REFER | DEPENDS ON SETTING | SIMILAR TO NORMAL MODE |
| | ATTRIBUTE CHANGE | DEPENDS ON SETTING | SIMILAR TO NORMAL MODE |
| | ACCESS RIGHT CHANGE | DEPENDS ON SETTING | SIMILAR TO NORMAL MODE |
| | ENTRY ADD | DEPENDS ON SETTING | SIMILAR TO NORMAL MODE |
| | ENTRY DELETE | DEPENDS ON SETTING | SIMILAR TO NORMAL MODE HOWEVER, THE FOLLOWING ARE FORBIDDEN (4) NEW REGISTRATION OF FILE IN CLASSIFICATION TARGET RANGE AND HAVING CLASSIFICATION TARGET ATTRIBUTE (5) CHANGE OF ATTRIBUTE OF FILE IN CLASSIFICATION TARGET RANGE AND HAVING CLASSIFICATION NON-TARGET ATTRIBUTE TO CLASSIFICATION TARGET ATTRIBUTE (6) CHANGE OF ATTRIBUTE OF FILE IN CLASSIFICATION TARGET RANGE AND HAVING CLASSIFICATION TARGET ATTRIBUTE TO CLASSIFICATION NON-TARGET ATTRIBUTE (7) MOVEMENT OF FILE IN CLASSIFICATION TARGET RANGE AND HAVING CLASSIFICATION TARGET ATTRIBUTE TO OUTSIDE OF CLASSIFICATION TARGET RANGE (8) MOVEMENT OF FILE OUTSIDE OF CLASSIFICATION TARGET RANGE AND HAVING CLASSIFICATION TARGET ATTRIBUTE TO CLASSIFICATION TARGET RANGE |

FIG. 4

| DOCUMENT | ATTRIBUTE INFORMATION | | |
|---|---|---|---|
| | CORRESPONDING PROJECT | DOCUMENT TYPE | APPROVAL STATUS |
| A | PROJECT 1 | MANUAL | APPROVED |
| B | PROJECT 1 | SPECIFICATION | NOT YET APPROVED |
| C | PROJECT 1 | MANUAL | NOT YET APPROVED |
| D | PROJECT 1 | SPECIFICATION | APPROVED |
| E | PROJECT 2 | SPECIFICATION | APPROVED |
| F | PROJECT 2 | SPECIFICATION | NOT YET APPROVED |
| G | PROJECT 2 | HELP FILE | WAITING FOR APPROVAL |
| H | PROJECT 3 | MANUAL | APPROVED |
| I | PROJECT 3 | HELP FILE | WAITING FOR APPROVAL |

FIG. 7

| DOCUMENT | ATTRIBUTE INFORMATION | | |
|---|---|---|---|
| | CORRESPONDING PROJECT | DOCUMENT TYPE | APPROVAL STATE |
| X | PROJECT 4 | MANUAL | APPROVED |

FIG. 9

| | DOCUMENT | ATTRIBUTE INFORMATION | | |
|---|---|---|---|---|
| | | CORRESPONDING PROJECT | DOCUMENT TYPE | APPROVAL STATE |
| BEFORE CHANGE | G | PROJECT 2 | HELP FILE | WAITING FOR APPROVAL |
| AFTER CHANGE | | PROJECT 2 | MANUAL | APPROVED |

FIG. 10

STORAGE MEDIUM FOR ELECTRONIC INFORMATION PROCESSING PROGRAM, ELECTRONIC INFORMATION PROCESSING SYSTEM, AND ELECTRONIC INFORMATION PROCESSING METHOD

CROSS-REFERENCE TO RELATED APPLICATIONS

This application is based on and claims priority under 35 USC 119 from Japanese Patent Application No. 2007-229381, filed on Sep. 4, 2007.

BACKGROUND

1. Technical Field

The present invention relates to a storage medium for an electronic information processing program, to an electronic information processing system, and to an electronic information processing method.

2. Related Art

In a computer, there may be cases in which various sets of data (or files) are stored and managed in storage locations having a hierarchical structure.

SUMMARY

According to one aspect of the invention, there is provided a program having a process including correlating electronic information which is correlated to a first correlation location in a first correlation structure also to a second correlation location in a second correlation structure according to a correlation condition based on the first correlation location or the electronic information, and executing an operation on the electronic information or the first correlation location in the first correlation structure, wherein there can be switched permission and forbiddance of execution of at least a part of the operations, among the operations, which changes a correlation result in the correlating.

BRIEF DESCRIPTION OF THE DRAWINGS

Exemplary embodiment(s) of the present invention will be described based on the following figures, wherein:

FIG. 4 is a diagram showing example static access right data;

FIG. 7 is a diagram showing example file attribute information;

FIG. 9 is a diagram for explaining an example constraint of an access right; and FIG. 10 is a diagram for explaining another example constraint of an access right.

DETAILED DESCRIPTION

[Explanation of Terms and Concepts]

Figure 1:
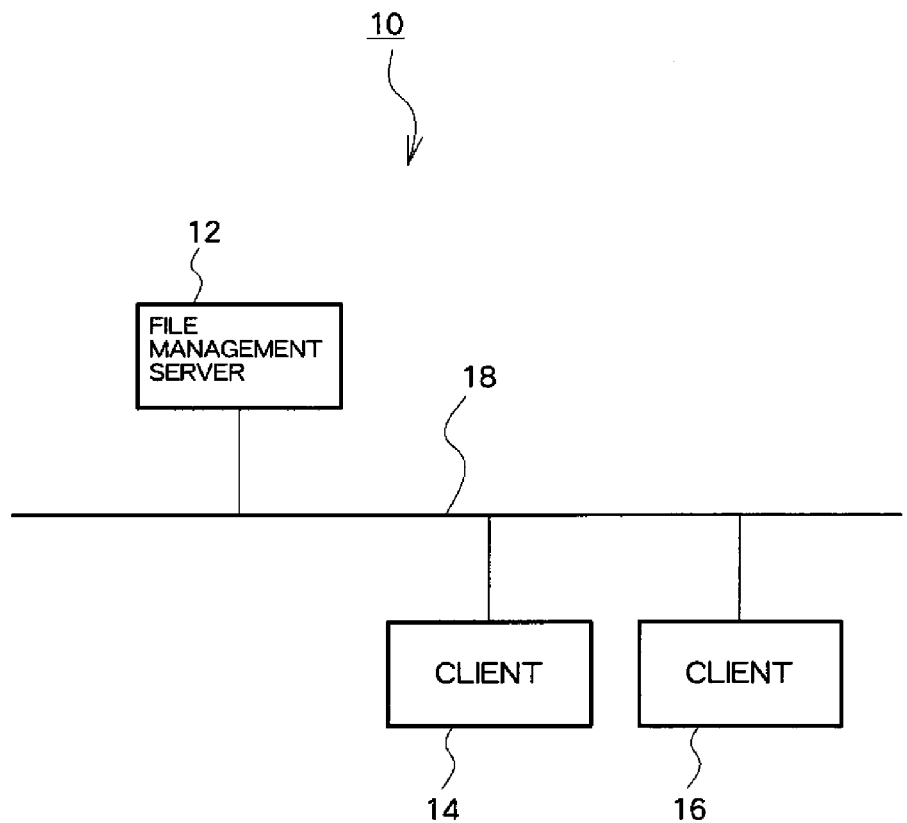
FIG. 1 is a schematic diagram showing an example structure of a file management system.

A computer is a device which executes a calculation process according to a program, or a device which executes a similar calculation process by means of hardware. The computer device can be arbitrarily constructed. For example, the computer device may be constructed from one board or one housing and may execute a centralized process, or may be constructed from multiple housings which can communicate with each other and may execute a distributed process. An electronic information processing system is a system constructed using such a computer.

A first correlation structure and a second correlation structure are structures having one or multiple correlation locations to which electronic information is correlated. The correlation structure may be constructed using, for example, a function of an OS (Operating System) program or may be constructed using a function of an application program. Examples of the former include configurations using a directory structure in a UNIX(registered trademark)-based OS and a folder structure in Windows (registered trademark). Examples of the latter include a structure of an application file which manages or classifies files, and a structure for display. Examples of the structure include various configurations such as a hierarchical structure, a flat structure, and a structure in which electronic information is distributed and placed two-dimensionally or three-dimensionally. The correlation location is provided in such a structure, and one or multiple pieces of electronic information can be correlated. The correlation is executed by directly or indirectly associating the electronic information and the correlation location. Examples of the correlation include a configuration in which there is set link information which allows one or both of the electronic information and the correlation location to search the other and a configuration in which the electronic information is stored in a storage region for the correlation location. The electronic information is one or multiple sets of data. No particular limitation is imposed on the type of the data, and the data may be of various forms such as document data, image data, program data, etc. The data are in many cases managed in a format of a file (a collection of data managed by the computer).

A correlating unit correlates electronic information correlated to a first correlation location in a first correlation structure also to a second correlation location in a second correlation structure. This correlation is executed according to a correlation condition based on the first correlation location or the electronic information. Examples of a configuration based on the first correlation location include a configuration based on an attribute of the first correlation location and a configuration based on position information of the correlation location. Here, the attribute of the first correlation location is information which is maintained by the first correlation location itself, or maintained in another location associated with the first correlation location and which indicates a characteristic of the first correlation location. Examples of the attribute include date and time of creation, date and time of editing, a name, name of an owner, etc. The position information of the correlation location is information such as, for example, a depth in the hierarchical structure and degree of association with a peripheral correlation location. Examples of a configuration based on the electronic information include a configuration based on an attribute of the electronic information and a configuration based on a content of the electronic information. The attribute of the electronic information is information indicating a characteristic of the electronic information, and examples include information which is associated with the electronic information and which is maintained separately from the electronic information, and meta information embedded in the electronic information. More specifically, the examples include information such as date and time of creation, date and time of editing, a name, a file type, name of an owner, etc. Examples of the content of the electronic information include an analysis result of a description content in a document file and an analysis result of an image in an image file.

An operating unit executes an operation on the electronic information or the first correlation location in the first correlation structure. The execution of an operation in the first correlation structure means, for example, identifying a described first correlation location or desired electronic information using association or display based on the first correlation structure and executing an operation.

A switching unit switches between permission and forbiddance of execution of at least part of operations which changes a correlation result by the correlating unit. The changing of the correlation result by the correlating unit means that, when the correlating unit is again executed after execution of the operation by the operating unit, a result which differs completely or in part from the original result is obtained. The switching unit is a unit which switches permission and forbiddance of execution of all or a part of such operations. When the operation by the operating unit is based on an instruction from a user issued through a user interface or the like, the forbiddance of the execution of the operation may be achieved by disabling the input itself of the instruction by the user (such as operation in the user interface) or by disabling the processing operation for the user's instruction.

Here, a program which controls the computer may be provided through a storage medium such as a CD (Compact Disc) or a DVD (Digital Versatile Disc) or through a network. In this case, the program is installed from the storage medium or the network based on an operation of the user or according to a setting. Here, an install means a setting of a program to enable control of the computer.

[Exemplary Embodiment]

FIG. 1 is a diagram for explaining an example structure of a file management system 10 according to an exemplary embodiment of the present invention. The file management system 10 includes a file management server 12, clients 14 and 16, and a network 18, such as the Internet, which connects these devices to allow mutual communication. The file management server 12 is a device functioning as an electronic information processing system, and the clients 14 and 16 are devices which use the file management server 12.

Figure 2:
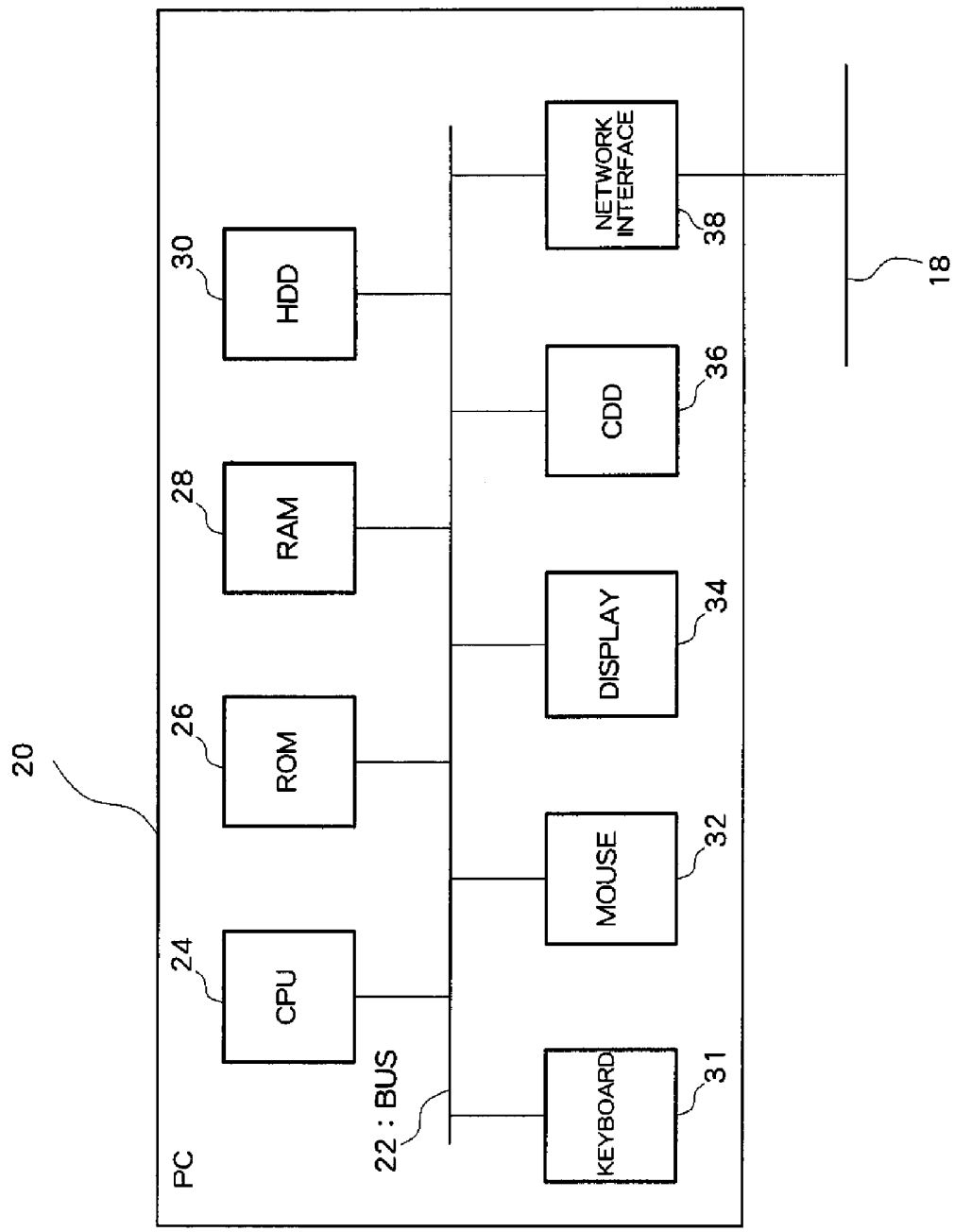
FIG. 2 is a schematic diagram showing an example hardware structure of a PC.

FIG. 2 is a diagram showing an example hardware structure of a PC (Personal Computer) 20 which is an example of a computer constructing the file management system 10 or the client 14 or 16. The PC 20 includes a bus 22 serving as an internal communication path. On the bus 22, there are connected various constituent elements including a CPU (Central Processing Unit) 24, a ROM (Read Only Memory) 26, a RAM (Random Access Memory) 28, an HDD (Hard Disc Drive) 30, a keyboard 31, a mouse 32, a display 34, a CDD (Compact Disc Drive) 36, and a network interface 38. The CPU 24 is a device which executes a calculation process according to a program, and executes a necessary calculation and controls the constituent elements of the computer 20. The ROM 26 is a storage device which stores a program or the like which controls the CPU 24. The RAM 28 is a storage device which temporarily stores a file or data which are a target of calculation by the CPU 24, and the HDD 30 is a storage device which is used for long-term storage of a large amount of data. The keyboard 31 and the mouse 32 are input devices which receive an input from the user, and the display 34 is an output device which displays image information for the user.

The CDD 36 is a device which reads information from a CD which is a storage medium. For example, when the program which controls the CPU 24 is provided through a CD, the program is installed through the CDD 36. The network interface 38 is realized, for example, with a network interface card (NIC) and is a device which allows communication between the PC 20 and the network 18.

Figure 3:
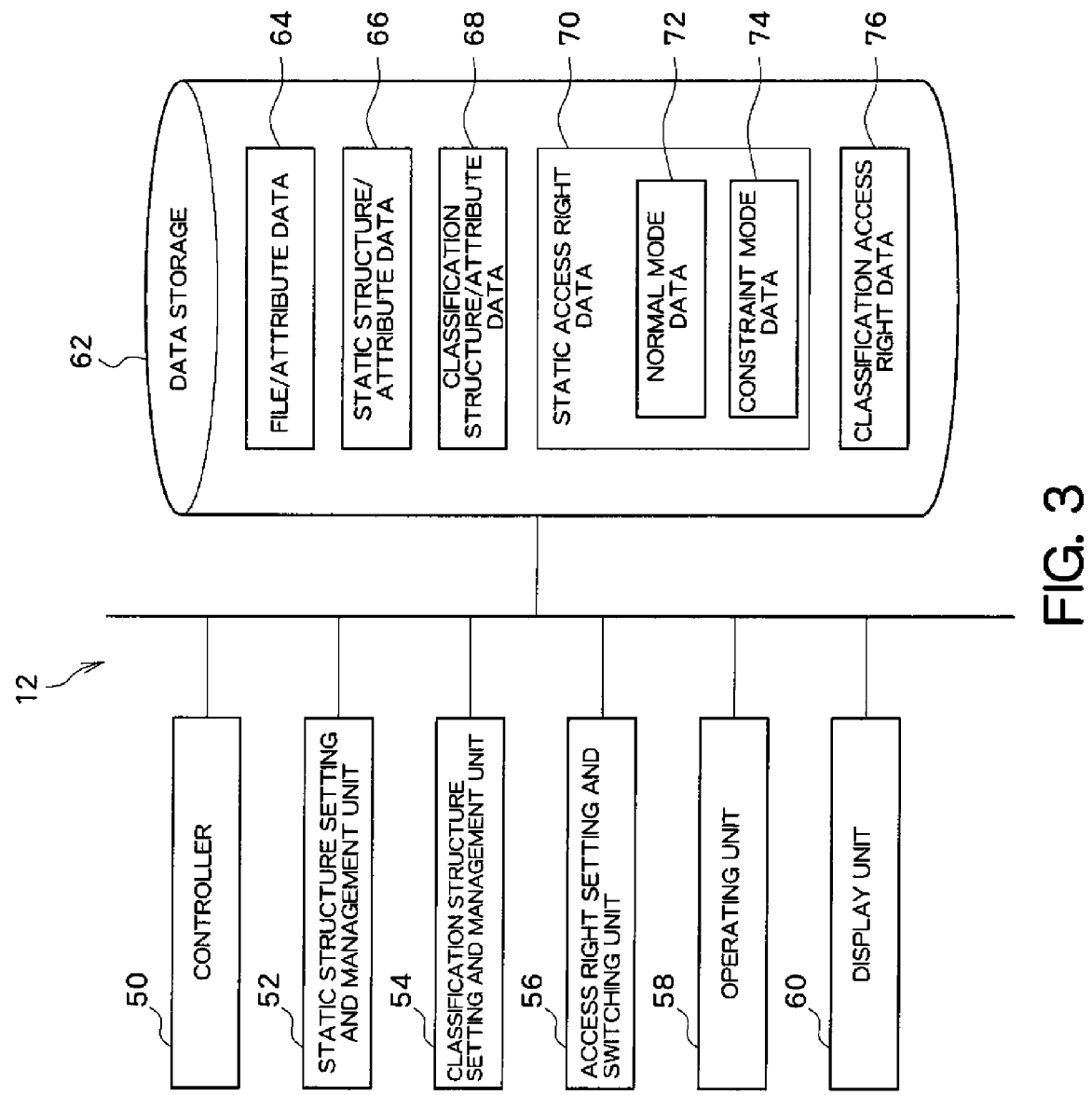
FIG. 3 is a schematic diagram showing an example functional structure of a file management server.

FIG. 3 is a diagram schematically showing an example functional structure of the file management server 12. The file management server 12 is realized by controlling, with a program, the PC 20 shown in FIG. 2.

The file management server 12 includes a controller 50, a static structure setting and management unit 52, a classification structure setting and management unit 54, an access right setting and switching unit 56, an operating unit 58, a display unit 60, and a data storage 62. The controller 50 is constructed from the CPU 24 and controls the operations of the functional elements. The static structure setting and management unit 52 is constructed from the CPU 24 and sets and manages a static structure which is a correlation structure. The static structure is a standard file storage structure for managing files, and folders in which files are stored are placed in a hierarchical manner. In other words, the static structure is a structure in which a file can be definitively stored according to a user instruction. The classification structure setting and management unit 54 is constructed from the CPU 24, and sets and manages a classification structure which is a correlation structure. The classification structure is a structure constructed for classifying and sorting files, and folders in which files are classified are placed in a hierarchical manner. Multiple classification structures may be provided for different objects of classification. In the classification structure, unlike the static structure, it may be the case that the file is not definitively classified based on the user instruction, and the file may be classified in a manner not intended by the user. The access right setting and switching unit 56 is constructed from the CPU 24 and sets an access right to a folder in the static structure or in the classification structure, and sets an access right for a file or a group of files stored or classified in such a folder. In addition, the access right setting and switching unit 56 switches between multiple prepared access right settings. The operating unit 58 is constructed from the input devices such as the keyboard 31 and the mouse 32, and is used by the user for instruction. When the server is operated from another PC 20 at a remote location, the operating unit 58 functions based on an input from the keyboard 31 and mouse 32 of that PC 20. The display unit 60 is constructed from the display 34, and displays a control result, the static structure, the classification structure, and the file. When the server is operated from another PC 20 at a remote location, the display unit 60 is constructed from the display 34 of that PC 20.

The data storage 62 is constructed from the ROM 26, the RAM 28, and the HDD 30. The data storage 62 stores various data (files) including file/attribute data 64, static structure/attribute data 66, classification structure/attribute data 68, static access right data 70, and classification access right data 76. The file/attribute data 64 are various files and attribute data of the files. The static structure/attribute data 66 include data defining the static structure, data for identifying a file stored in a folder in the static structure, and attribute data related to the folder of the static structure. The classification structure/attribute data 68 include data defining the classification structure, data for identifying a file classified in a folder of the classification structure, and attribute data related to the folder in the classification structure. The attribute data are also used as the classification condition.

The static access right data 70 are data indicating a setting status of an access right for a folder of the static structure and a setting state of an access right for a file stored in the folder of the static structure. The static access right data 70 include normal mode data describing an access right which is set in a normal case and constraint mode data 74 constraining the access right which affects the classification result. These data are switched by the access right setting and switching unit 56. The classification access right data 76 are data indicating a setting status of an access right for a folder of a classification structure and a setting state of an access right for a file stored in the folder in the classification structure. The static access right data 70 and the classification access right data 76 may be set separately for each user. More specifically, there may be employed configurations in which the data are set for general users and privileged users or configurations in which the data are set for each general user.

FIG. 4 is a diagram showing a concrete example of the static access right data 70 in a table format. In FIG. 4, an "access right" column indicating a type of the access right, a "normal mode" column indicating a value of the normal mode data 72, and a "constraint mode" column indicating a value of the constraint mode data 74 are provided. As the access right, "delete," "attribute refer," "attribute change," and "access right change" are provided for various "files"; "content refer" and "content change" are provided for "document" files; and "delete," "attribute refer," "attribute change," "access right change," "entry add," and "entry delete" are provided for "folders.". The delete right for a file is an authority to delete the file, the attribute refer right for a file is an authority to refer the attribute of the file, the attribute change right for a file is an authority to change the attribute of the file, and the access right change for a file is an authority to change the setting of various access rights for the file. The content refer right for a document and the content change right for a document are an authority to refer to the content of the document and an authority to change (edit) the document, respectively. The delete right, attribute refer right, attribute change right, and access right change right for a folder are similar to those for the file. The entry add right for a folder is an authority to register (store) a file and a folder at a lower hierarchical level of a designated folder, and the entry delete right for a folder is an authority to delete a file and a folder in a lower hierarchical level of a designated folder.

In the normal mode, these access rights are set according to a standard specification or a specification designated by the user. In the constraint mode, the access rights which do not affect the classification result in the classification structure are set similar to the normal mode. However, the access right which affects the classification result is constrained in the constraint mode.

More specifically, with regard to the access right for a file, (1) forbiddance of deletion, (2) forbiddance of change of an attribute to an attribute which is not a classification target, and (3) forbiddance of movement to a range outside of the classification are set for files stored in the folder in a classification target range and having a classification target attribute. In addition, with regard to the access right for a folder, there are set (4) forbiddance of new registration of a file in the classification target range and having a classification target attribute, (5) forbiddance of change of attribute of files in the classification target range and having an attribute which is not a classification target to a classification target attribute, (6) forbiddance of change of attribute of files in a classification target range and having a classification target attribute to an attribute which is not an classification target, (7) forbiddance of movement of the files in the classification target range and having a classification target attribute to outside of the classification target range, and (8) forbiddance of movement to the target classification range of the files outside of the classification target range and having the classification target attribute.

These constraints of access rights for the files and folders are defined so that the files to be classified are not changed, but a change in the classification destination of the file is still allowed. Alternatively, the access right may be constrained so that the change of the classification destination of the file is not permitted. In addition, it is also possible to employ a configuration in which the change of the classification destination of an already-existing file is forbidden, but a new file may be registered or the already-existing file may be deleted.

The concrete constraints of the access rights in the constraint mode may be set in advance, as shown in (1)-(8) in FIG. 4. Alternatively, it is also possible to employ a configuration in which influence on a classification result is determined based on a result of a virtual re-classification at the point of execution of an operation on the static structure and a constraint is imposed as suited.

Figure 5:
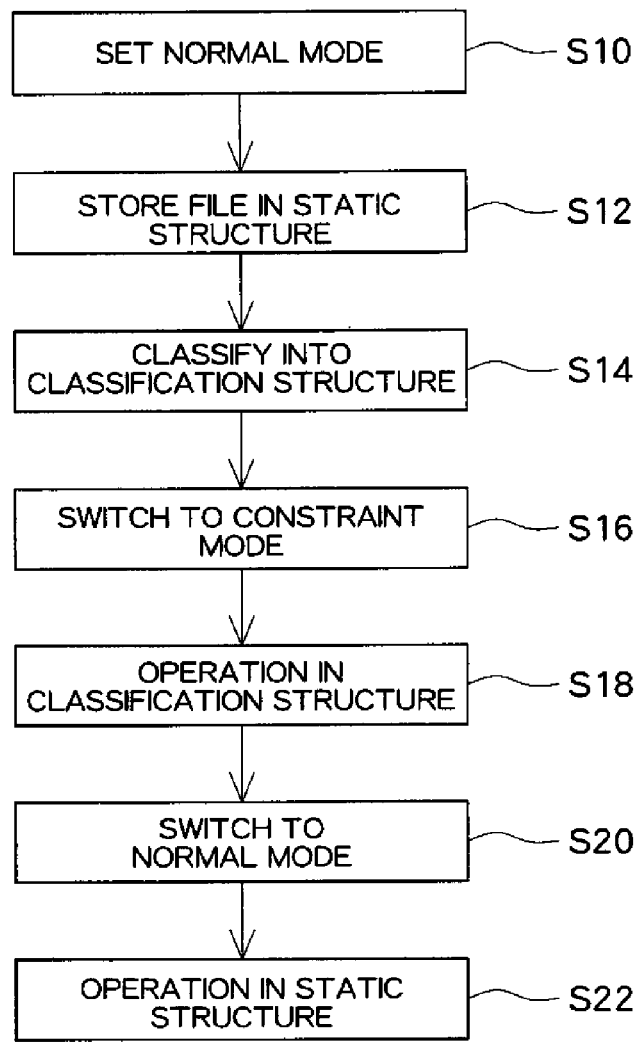
FIG. 5 is a diagram showing an example flow of a process in a file management system.

Next, an example of a process using the file management system 10 will be briefly described with reference to a flowchart of FIG. 5. In the file management server 12, generally, a normal mode is set (S10). More specifically, the access right setting and switching unit 56 sets the access rights as shown in FIG. 4 based on an instruction from the operating unit 58 and switches the access rights so that the normal mode is employed. The client 14 accessing the file management server 12 constructs the static structure based on the access rights of the normal mode, and stores a file in a folder (S12). The construction of the static structure is executed by the static structure setting and management unit 52, and the result of the construction is maintained as static structure/attribute data 66. When the client 14 wishes to classify the files stored in the static structure from a different point of view, the client 14 instructs construction of a desired classification structure. Based on this instruction, the classification setting and management unit 54 constructs the classification structure/attribute data 68. The classification of the files is executed using, as a classification condition, the attribute data attached to the folders in the classification structure. In other words, the classification structure setting and management unit 54 classifies, in the classification structure, the files in the classification target range of the static structure when the classification structure is constructed or when the user instructs display according to the classification structure (S14). The classification result is stored in the classification structure/attribute data 68.

The client 14 can execute various operations on the classification result based on the access rights which are set in the classification access right data 76. During this operation, if the client 14 or another client 16 executes an operation such as deletion or change (editing) of the file in the static structure, the degree of match between the classification structure and the static structure may be reduced or the match itself may be destroyed (reflection to the classification structure may be executed immediately, periodically, or based on a user instruction). In consideration of this, the client 14 switches to the constraint mode to constrain the access right in the static structure which may affect the classification result (S16), and then executes the operation in the classification structure (S18). When the operation in the classification structure is completed, the mode is switched to the normal mode (S20). In this manner, an operation according to the access right in the normal mode can be executed in the static structure (S22).

Next, the exemplary embodiment will be described with a concrete example with reference to FIGS. 6-10.

Figure 6:
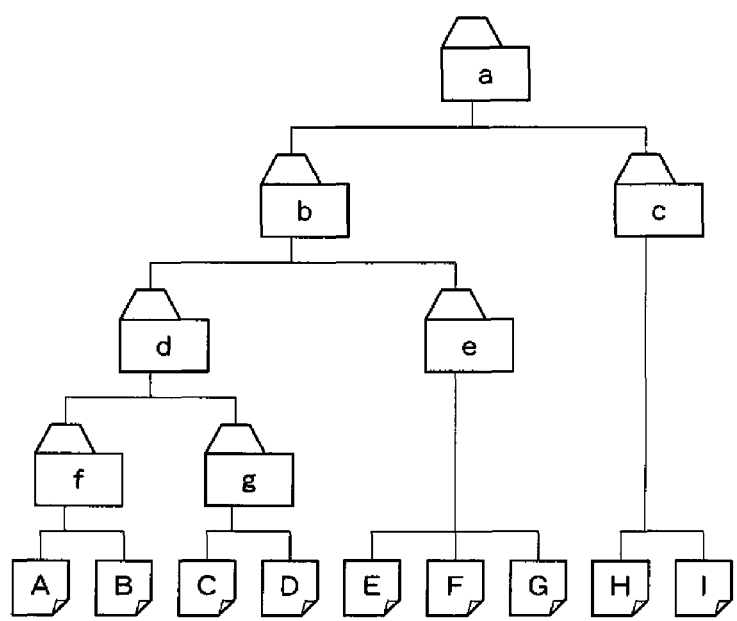
FIG. 6 is a diagram showing an example static structure.

FIG. 6 is a diagram showing an example static structure constructed in the static structure/attribute data 66 of FIG. 3. The static structure has a folder a at the uppermost hierarchical level, and folders b and c are provided at a lower hierarchical level of the folder a. In addition, folders d and e are provided at a lower hierarchical level of the folder b and folders f and g are provided at a lower hierarchical level of the folder d. In the static structure, multiple files representing documents maintained in the file/attribute data 64 of FIG. 3 are stored. More specifically, the folder f stores documents A and B, the folder g stores documents C and D, the folder e stores documents E, F, and G, and the folder c stores documents H and I. The creation of these folders and storage (registration) of the files are executed by an instruction of a user having the entry add right for the folder.

FIG. 7 is a diagram showing example attribute information of the documents shown in FIG. 6. The attribute information is maintained in the file/attribute data 64 of FIG. 3, and, in the illustrated example, three items including a corresponding project, a document type, and an approval status are shown as the attribute information. The corresponding project is an attribute indicating a project which is closely associated with the document. The document type is an attribute representing a type of the document, and the approval status is an attribute indicating a status of approval by an authorized person.

In the illustrated example, the values of the corresponding project attribute are "project 1" for documents A-D, "project 2" for documents E-G, and "project 3" for documents H and I. The values of the document type attribute are a "manual" for documents A, C, and H, a "specification" for documents B, and D-F, and a "help file" for documents G and I. The values of the approval status attribute are "approved" for the documents A, D, E, and H, "not yet approved" for documents B, C, and F, and "waiting for approval" for documents G and I.

Figure 8:
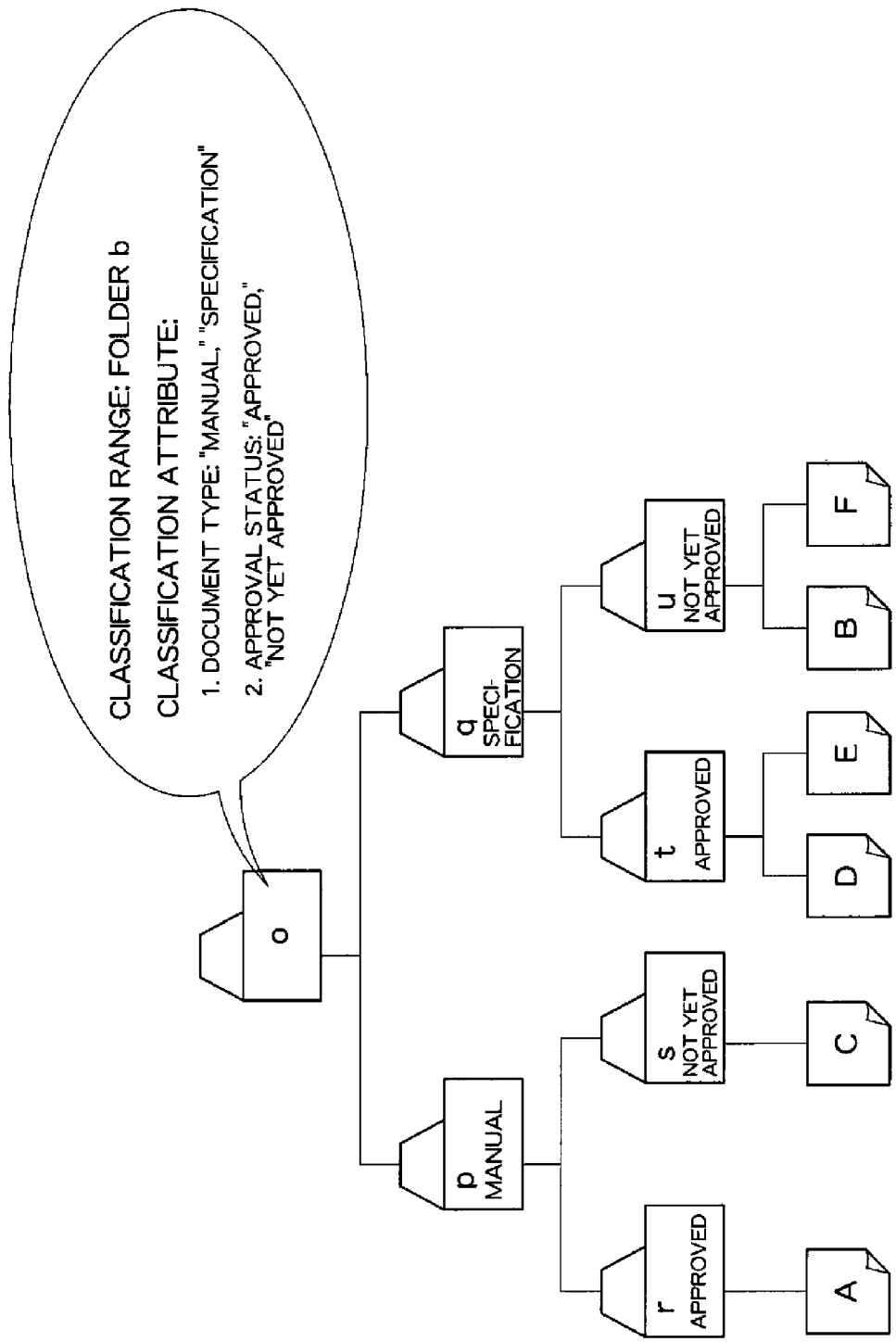
FIG. 8 is a diagram showing an example classification structure.

FIG. 8 is a diagram showing an example classification structure. The classification structure is set based on an instruction from a certain client (user). More specifically, as the classification condition, the folder b and the folders in the lower hierarchical levels of the folder b in the static structure are set as the classification target range, and the classification target attribute is set so that the document types of "manual" and "specification" are considered first and the approval statuses of "approved" and "not yet approved" are considered second. According to the classification conditions, a folder p for classifying a "manual" and a folder q for classifying a "specification" are constructed at a lower hierarchical level of a folder o, which is at the uppermost hierarchical level. In addition, a folder r for classifying "approved" and a folder s for classifying "not yet approved" are constructed at a lower hierarchical level of the folder p, and a folder t for classifying "approved" and a folder u for classifying "not yet approved" are provided at a lower hierarchical level of the folder q.

In the folder r, the document A is classified. Because the document A is in a folder at a lower hierarchical level of the folder b, and has a document type of "manual" and an approval status of "approved," the document A is classified into the folder r having the classification conditions matching these attributes. Similarly, the document C is classifying in the folder s, the documents D and E are classified in the folder t, and documents B and F are classifying in the folder u.

An operation by a user (client) which can be executed through the classification structure on the classification result is defined by the access right defined in the classification access right data 76. For example, whether or not the client (user) instructing the classification or another client can execute an operation such as viewing depends on the setting of the access right.

Meanwhile, an operation by the client (user) which can be executed for the static structure is defined by the access right defined in the static access right data 70. If the mode is in the normal mode, the access right defined in the normal mode data 72 is applied and, if the mode is in the constraint mode, the access right defined in the constraint mode data 74 is applied.

In the following, examples of the constraints (1)-(8) shown in FIG. 4 will be described in a concrete manner.

For example, if an operation to delete the document B is executed when the mode is in the constraint mode, the operation is an operation to delete the document B from the classification result, and, thus, is forbidden based on the constraint (1).

An operation to change the attribute value of the document type of the document B to a "technical report" is also forbidden, because, in the classification structure of FIG. 8, only the "manual" and the "specification" are set as the document type attribute for classification and the "technical report" is an attribute which is not a classification target attribute. Similarly, the attribute value of the approval status cannot be changed to values other than "approved" and "not yet approved," and a change to, for example, "waiting for approval" is forbidden. These are examples of constraint (2) or (6).

The document B cannot be moved to the folder c in the static structure. This is due to constraint (3) or (7), which forbids movement to a folder which is outside of the classification target range which, in this case, is the folder b.

FIG. 9 is a diagram for explaining the constraint (4). FIG. 9 shows a new document X having the values of the attributes of the corresponding project, the document type, and the approval status set to "project 4," "manual," and "approved." The document X cannot be registered (stored), for example, in the folder e of the static structure, because if the document X is registered, the document X would be included in the classification target.

FIG. 10 is a diagram for explaining the constraint (5). The document G which is to be described with reference to FIG. 10 is a file stored in the folder e of the static structure, as shown in FIG. 6. Here, a case is considered in which the values of the attributes of the corresponding project, the document type, and the approval status in document G are to be changed from "project 2," "help manual," and "waiting for approval" to "project 2," "manual," and "approved." In this case, the document G which was stored in the folder in the classification target range but is set as a non-classification target because the attribute values differ from the classification conditions would have attribute values which match the classification conditions. Therefore, such a change of attribute is forbidden.

In addition, for example, movement of the document H from the folder c to the folder e is forbidden because the document H which has not been included in the classification target range is to be moved to a folder in the classification target range, which corresponds to the constraint (8).

Alternatively, in the constraint mode, not all of the constraints (1)-(8) are necessarily required, and it may be the case that only a part of the constraints (1)-(8) is required. In addition, in the constraints (1)-(8), movement or attribute change which results in a re-classification of a document which is classified in a certain folder to another folder is permitted, but alternatively, such operations may be forbidden.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. A non-transitory computer-readable storage medium storing a program causing a computer to function as:
   a storage unit that stores electronic information according to a user instruction in a storage location within a storage structure;
   a classifying unit that classifies the electronic information into a classification location within a classification structure, the classification being carried out according to a classification condition based on the storage location or the electronic information;
   an operating unit that receives an operation instruction concerning the electronic information or the storage location while the storage structure is displayed on a display device, and executes an operation according to the operation instruction;
   an access right storage unit that stores a normal access right data which is set in a normal access mode and a constraint access right data which is set in a constraint access mode; and
   a switching unit that switches access mode from one of the normal and constraint access modes to another one of the normal and constraint access modes;
   wherein, in the normal access mode, the operating unit executes the operation according to the operation instruction based on the normal access right data, the normal access right data being set regarding the electronic information or the storage structure;
   wherein, in the constraint access mode, the operating unit executes the operation according to the operation instruction based on the normal access right data when the execution of the operation does not change the classification within the classification structure;
   wherein, in the constraint access mode, the operating unit prevents execution of operation which causes the classification within the classification structure to be changed.

2. The non-transitory computer-readable storage medium according to claim 1, wherein the classification condition includes a condition for selecting electronic information to be a target of classification;
   wherein, in the constraint access mode, the operating unit does not execute any operation in which electronic information which is not a target of classification by the classifying unit becomes a target of classification, or in which electronic information which is a target of classification by the classifying unit becomes excluded from a target of classification.

3. The non-transitory computer-readable storage medium according to claim 1, wherein the classification structure comprises a plurality of classification locations;
   wherein, in the constraint access mode, the operating unit does not execute any operation in which electronic information classified in a certain classification location is classified into another classification location.

4. The non-transitory computer-readable storage medium according to claim 2, wherein the classification structure comprises a plurality of classification locations;
   wherein, in the constraint access mode, the operating unit does not execute any operation in which electronic information classified in a certain classification location is classified into another classification location.

5. The non-transitory computer-readable storage medium according to claim 2, wherein the classification condition includes a condition for selecting, based on a storage location within the storage structure, an electronic information to be a target of classification;
   wherein, in the constraint access mode, the operating unit does not execute any operation when the operation is an operation for changing a storage location of electronic information from a storage location which is a target of classification to a storage location which is excluded from a target of classification, or when the operation is an operation for changing a storage location of electronic information from a storage location which is excluded from a target of classification to a storage location which is a target of classification.

6. The non-transitory computer-readable storage medium according to claim 2, wherein the classification condition includes a condition for selecting, based on a storage location within the storage structure, an electronic information to be a target of classification;
   wherein, in the constraint access mode, the operating unit does not execute any operation when the operation is an operation for newly storing electric information in a storage location which is a target of classification, or when the operation is an operation for deleting electric information from a storage location which is a target of classification.

7. The non-transitory computer-readable storage medium according to claim 5, the classification condition includes a condition for selecting, based on a storage location within the storage structure, an electronic information to be a target of classification;
   wherein, in the constraint access mode, the operating unit does not execute any operation when the operation is an operation for newly storing electric information in a storage location which is a target of classification, or when the operation is an operation for deleting electric information from a storage location which is a target of classification.

8. The non-transitory computer-readable storage medium according to claim 2, wherein the classification condition includes a condition for selecting, based on an attribute of electronic information, an electronic information to be a target of classification;
   wherein, in the constraint access mode, the operating unit does not execute any operation when the operation is an operation for changing an attribute of electronic information from an attribute which is a target of classification to an attribute which is excluded from a target of classification, or when the operation is an operation for changing an attribute of electronic information from an attribute which is excluded from a target of classification to an attribute which is a target of classification.

9. The non-transitory computer-readable storage medium according to claim 5, wherein the classification condition includes a condition for selecting, based on an attribute of electronic information, an electronic information to be a target of classification;

wherein, in the constraint access mode, the operating unit does not execute any operation when the operation is an operation for changing an attribute of electronic information from an attribute which is a target of classification to an attribute which is excluded from a target of classification, or when the operation is an operation for changing an attribute of electronic information from an attribute which is excluded from a target of classification to an attribute which is a target of classification.

10. The non-transitory computer-readable storage medium according to claim 6, the classification condition includes a condition for selecting, based on an attribute of electronic information, an electronic information to be a target of classification;
   wherein, in the constraint access mode, the operating unit does not execute any operation when the operation is an operation for changing an attribute of electronic information from an attribute which is a target of classification to an attribute which is excluded from a target of classification, or when the operation is an operation for changing an attribute of electronic information from an attribute which is excluded from a target of classification to an attribute which is a target of classification.

11. The non-transitory computer-readable storage medium according to claim 3, the classification condition includes a condition for selecting, based on an attribute of electronic information, a classification location for carrying out classification;
   wherein, in the constraint access mode, the operating unit does not execute any operation when the operation is an operation for changing an attribute of electronic information and a classification location of the electronic information before executing the operation is different from a classification location of the electronic information.

12. The non-transitory computer-readable storage medium according to claim 1, wherein, in the constraint access mode, the operating unit does not execute any operation in all cases in which a result of classification carried out by the classifying unit before executing the operation is different from a result of classification.

13. The non-transitory computer-readable storage medium according to claim 1, wherein the program further causes the computer to function as a display that displays, on a display device, the electronic information in correlation to the classification location based on a result of classification by the classifying unit;
   wherein, in the constraint access mode, the operating unit does not execute any operation when display carried out by the display before executing the operation is different from display carried out by the display.

14. A method of processing electronic information, the method comprising:
   storing electronic information according to a user instruction in a storage location within a storage structure;
   classifying the electronic information into a classification location within a classification structure, the classification being carried out according to a classification condition based on the storage location or the electronic information;
   receiving an operation instruction concerning the electronic information or the storage location while the storage structure is displayed on a display device;
   executing an operation according to the operation instruction;
   storing a normal access right data which is set in a normal access mode and a constraint access right data which is set in a constraint access mode;
   switching access mode from one of the normal and constraint access modes to another one of the normal and constraint access modes;
   executing, in the normal access mode, the operation according to the operation instruction based on the normal access right data, the normal access right data being set regarding the electronic information or the storage structure;
   executing, in the constraint mode, the operation according to the operation instruction based on the normal access right data when the execution of the operation does not change the classification within the classification structure; and
   not executing, in the constraint mode, an operation which causes the classification within the classification structure to be changed.

15. The electronic information processing method according to claim 14, wherein the classification condition includes a condition for selecting electronic information to be a target of classification;
   not executing, in the constraint access mode, the operating unit does not execute any operation in which electronic information which is not a target of classification becomes a target of classification, or in which electronic information which is a target of classification becomes excluded from a target of classification.

16. The electronic information processing method according to claim 14, the classification structure comprises a plurality of classification locations;
   not executing, in the constraint access mode, the operating unit does not execute any operation when electronic information classified in a certain classification location is classified into another classification location in the result of the virtual classification.

17. The computer-readable storage medium according to claim 1, wherein the correlation condition includes a condition based upon an approval status of the electronic information.

18. An electronic information processing system including a memory and a processor, comprising:
   a storage unit that stores electronic information according to a user instruction in a storage location within a storage structure;
   a classifying unit that classifies the electronic information into a classification location within a classification structure, the classification being carried out according to a classification condition based on the storage location or the electronic information;
   an operating unit that receives an operation instruction concerning the electronic information or the storage location while the storage structure is displayed on a display device, and executes an operation according to the operation instruction;
   an access right storage unit that stores a normal access right data which is set in a normal access mode and a constraint access right data which is set in a constraint access mode; and
   a switching unit that switches access mode from one of the normal and constraint access modes to another one of the normal and constraint access modes;
   wherein, in the normal access mode, the operating unit executes the operation according to the operation instruction based on the normal access right data, the normal access right data being set regarding the electronic information or the storage structure;

wherein, in the constraint access mode, the operating unit executes the operation according to the operation instruction based on the normal access right data when the execution of the operation does not change the classification within the classification structure;

wherein, in the constraint access mode, the operating unit prevents execution of an operation which causes the classification within the classification structure to be changed.

19. The electronic information processing system according to claim 18, wherein the classification condition includes a condition for selecting electronic information to be a target of classification;

wherein, in the constraint access mode, the operating unit does not execute any operation in which electronic information which is not a target of classification by the classifying unit becomes a target of classification, or in which electronic information which is a target of classification by the classifying unit becomes excluded from a target of classification.

* * * * *